July 16, 1940. M. SCHÄFER 2,208,148
CHANGE SPEED GEAR
Filed Nov. 21, 1938 3 Sheets-Sheet 3

Inventor:
Max Schäfer

Patented July 16, 1940

2,208,148

UNITED STATES PATENT OFFICE 2,208,148

CHANGE SPEED GEAR

Max Schäfer, Ohorn, near Kamenz, Germany

Application November 21, 1938, Serial No. 241,559
In Germany December 2, 1937

8 Claims. (Cl. 74—348)

This invention relates to a positively operating multi-step change speed gear provided with conical stepped gears.

The change speed gear according to the invention comprises a plurality of stepped gears arranged side by side on a cone drum or cone and a companion or control gear displaceably disposed along a line of the surface of the cone of stepped gears on the driving shaft, the operating motion of the control gear being positively determined at a variation in the ratio of gearing by a control shaft which cooperates in the rotation of the gear.

In the known gears of this type spiral or helical transition rows of teeth lead from one step to another, and the control gear travels on these teeth from one step to the next when a change of steps is to be effected. Such transition rows are difficult to produce, and for this reason alone gears requiring them have not been generally adopted. Furthermore, helical guiding of the control gear demands an accurately corresponding guide in the control shaft, which is particularly difficult in view of the fact that a left-hand and a right-hand spiral must be provided. In change speed gears having conical stepped gears this arrangement is practically possible only if the steps have a large distance between them. This means that the control gear and other control elements possess a very high axial speed, so that the known gears of this class have a low degree of efficiency and operate uneconomically. These are additional reasons why the known gears have not been introduced.

According to the invention, these drawbacks are overcome by producing each stepped gear from a plurality of toothed segments laterally displaced relative to one another, so that at a change of step the end tooth of the last segment of one step and the first tooth of the first segment of the next step are both positively in mesh with the control gear. The consequent variation of the ratio of gearing and the resulting sudden change in speed can be taken care of if necessary by the arrangement of an elastic intermediate member.

In the gear according to the invention the various steps may be closely adjacent to keep the gear as short as possible. Transition from one step to another is effected in positive manner, and the control path of the control gear from step to step is quite short. Since for this short control motion two revolutions of the gear cone are available, the control gear will be displaced at low axial speed even at high speeds of the change gear. This explains why even a small-dimensioned gear of this type is capable of transmitting relatively great forces.

Other features of the invention are described below with reference to the accompanying drawings which illustrate, by way of example, one embodiment of the invention.

Figure 1:
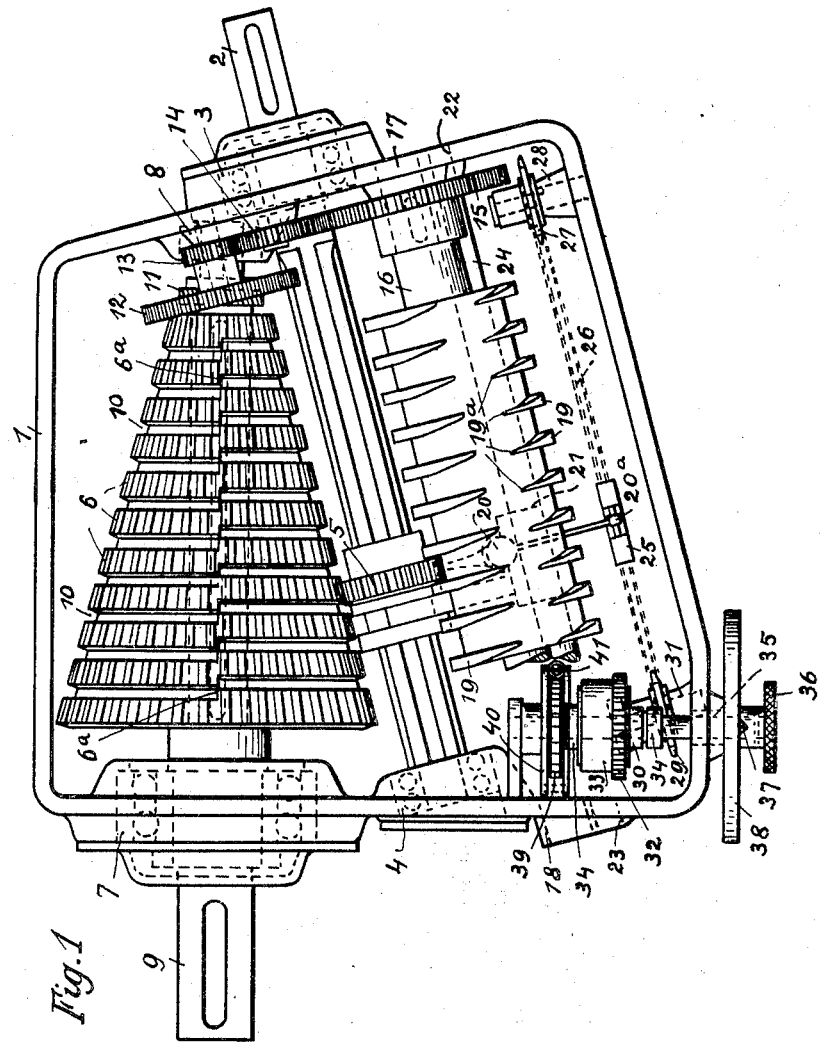
Figure 1 is a top view of the change speed gear according to the invention with the gear box open.

In a gear box 1 a driving shaft 2 is arranged in bearings 3 and 4 and carries an axially displaceable and non-rotatable controlling spur gear 5. To the driven shaft 9, disposed in bearings 7 and 8, stepped gears 6 are rigidly secured. Each stepped gear 6 is diametrically subdivided, and the two halves of the toothed rim of each step are displaced relative to one another. Correspondingly, the spaces 10 between the steps are subdivided and staggered, and the width of these spaces is equal to half the width of tooth of the control gear 5. The difference in the number of teeth from step to step can be divided by two, so that the opposite spaces 10 between the points of bisection 6a of the displaced rim halves of all steps are in perfect alignment.

One row of the spaces 10 serves for passing from the larger to the smaller step and the other row for operation in opposite direction.

A spur gear 11 secured to the driven shaft 9 acts by means of the spur gears 12, 13, 14, 15 at a reduction rate of, say, 8:1 on a control shaft 16 arranged at 17 and 18 in the gear box 1. The shaft 16 is provided at each step transition with a cam disc 19 which is interrupted at 19a for shifting into the smaller adjacent step and at 19b for shifting back into the larger step.

As the transitions from slow to high speed and vice versa are diametrically opposite on the conical gears and drive from the shaft 9 to the shaft 16 in the example shown is reduced at 8:1, the displacement of the interruptions 19a, 19b amounts to $\frac{1}{16}$ of the circumference of the cam disc, which corresponds to half a revolution of the gear wheel, so that they are not located opposite each other, but are mutually displaced to the extent of $\tfrac{1}{16}$ and $\tfrac{1}{16}$ of the circumference, respectively.

Figure 7:
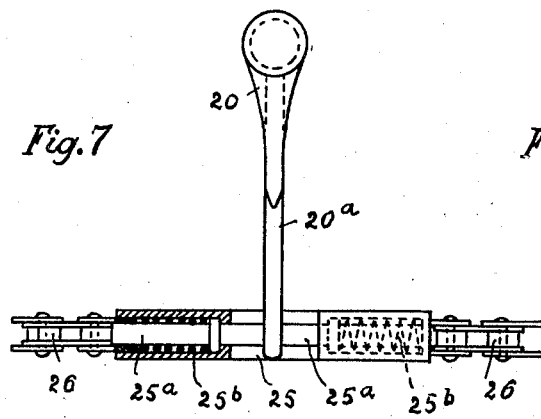
Fig. 7 is a top view of the elastic guide of the control arm of the control switch.
Figure 8:
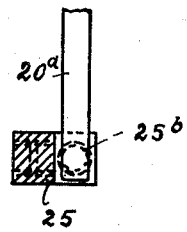
Fig. 8 is a side view of the arrangement shown in Fig. 7.

Between the cam discs 19 a control switch 20 is provided which is disposed in a control claw 21 and can be swung about the latter up to lateral stops. The claw 21 is axially displaceable on a guide rod 24 secured in the box 1 at 22 and 23, and engages an annular groove of the control gear 5 for driving purposes. The control switch 20 possesses a lever arm 20a which engages an elastic member 25 of a chain 26, as shown in Fig. 7. The arm 20a of the switch 20 engages between two pins 25a arranged on the member 25 and supported by the compression springs 25b, so that the pins 25a at lateral obstruction of the switch motion store up the remaining control motion by compression of the springs 25b.

The chain 26 is guided over a sprocket 27 rotatably disposed on a pin 28 secured in the casing 1. The chain 26 is driven by a sprocket wheel 29 firmly connected to a spur gear 30 which together with the sprocket 29 is arranged on a pin 31 in the casing 1. The spur wheel 30 is in mesh with a spur wheel 32 provided with a spring housing 33 and driven from the shaft 35 by the drivers 34.

The spring housing 33 contains the clock springs 33a, 33b for the two directions of shifting. The outer ends of these springs are secured to the housing 33, and each inner end is connected with a spring 33c, the collets 33c abutting with their pin ends 33d against the pin ends 33e of the housing 33 and thereby keeping the spiral springs 33a, 33b under initial tension. At a rotation of the shaft 35 the ends 34a of the drivers 34 drive by means of the collet pins 33f, according to direction, the spring 33a or 33b which is thus tensioned. In this way a clock spring tension corresponding to the number of control operations indicated by the pointer 37 is taken up.

A stop lever 40 provided with a tension spring 41 by means of the notched disc 39 firmly connected with the shaft 35, blocks up the shaft 35 at the set position of the pointer, and the stored up spring power is transmitted by the chain 26 to the switch 20. The step concerned is indicated at a disc 38 and adjusted through the medium of a handle 36 to which the pointer 37 is secured.

The control operation is carried out as follows:
The pointer 37 is first set to the desired number of steps on the disc 38 by means of the handle 36, whereby the lever 40 is caused to engage the corresponding notch and thus block up the shaft 35. When the next step is adjusted, the rotary motion is instantly transmitted by means of the spring housing 33 to the chain 26 which in consequence thereof advances to the extent of the width of a step. This motion is transmitted by the elastic member 25 to the arm 20a of the control switch 20 which is then moved about its pivot in the claw 21. The point of the control switch 20, unless the proper interruption 19a or 19b happens to pass, lies against the flank of the cam disc 19 concerned, and the elastic member 25 takes up the remaining portion of the control motion. At the proper moment the point of the control switch 20 is pressed into the interruption, so that the rotating cam disc 19 presses at 19a or 19b against the corresponding flank of the control switch 20 and at the right moment axially displaces the switch through and beyond the interruption. The claw 21 connected with the switch 20 and the controlling spur gear 5 are also driven in axial direction.

Even if the handle 36 is set to several steps by means of the pointer 37, the control switch 20 can nevertheless take up only one operation from one step to the next at the same moment, as the switch, owing to the provision of limiting stops, can carry out only the motion required for shifting to the extent of one step. The power needed for the other operations is in the meantime stored up in the spring housing 33 and will become gradually effective until the step indicated by the pointer has been reached.

The handle 36 is so constructed and arranged that somewhat less than a full rotation thereof corresponds to the control motion covering all steps of the gear.

Figure 2:
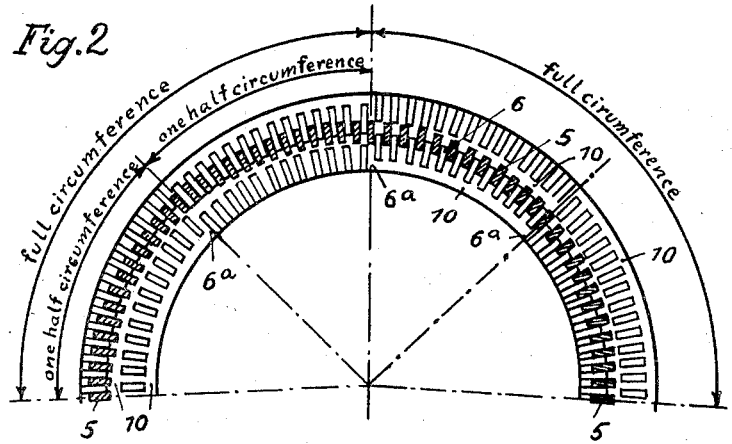
Fig. 2 shows a development of the double circumference of two gear steps.
Figure 3:
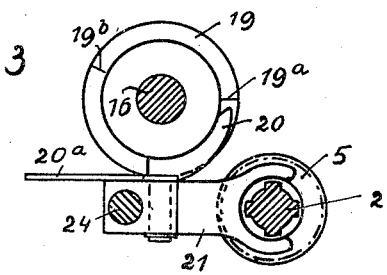
Fig. 3 is a side view of a cam disc provided with a control switch and control claw.
Figure 4:
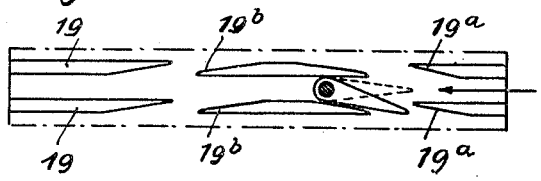
Fig. 4 shows the development of two cam discs.
Figure 5:
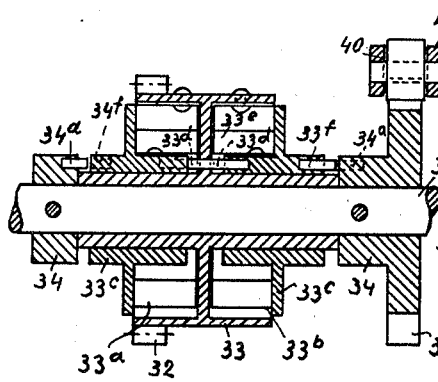
Fig. 5 is an axial section of a time switch.
Figure 6:
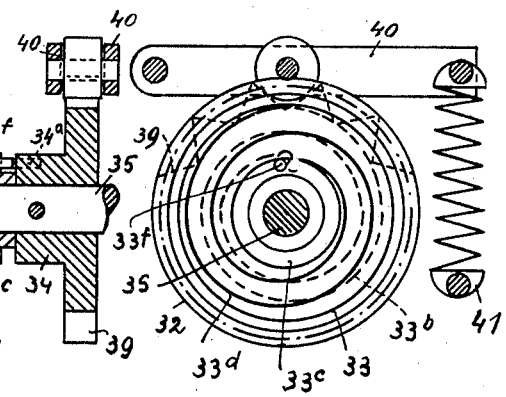
Fig. 6 is a side view of the time switch.

The path travelled by the teeth of the control gear 5 during operation at two revolutions of the cone gear, also in axial direction, is shown particularly in Fig. 2 which indicates how the displaced arrangement of the spaces 10 permits at half a rotation of a stepped gear motion of the control gear 5 to the extent of the width of a space 10 without bringing the teeth of the control gear 5 into contact with the adjacent step. After a full revolution of a stepped gear the teeth of the control gear 5 shown come out of engagement with the stepped gear having 28 teeth to engage instantly with half the width of tooth of the next stepped gear having 24 teeth. In the course of the second revolution of the stepped gear the control gear comes into full engagement with it.

I claim:

1. A change speed gear comprising a conical series of stepped bevel gears rigidly secured together the addendum lines of which lie on a common envelope and whose teeth decrease in number toward the vertex and a control wheel displaceable on its own shaft along the generating line of stepped cone by the rotation of a second shaft, each bevel gear consisting of a plurality of segments divisible by two and axially staggered at least to the extent of half the tooth width of the control wheel, so that upon gear change the end tooth of a segment of one gear wheel and simultaneously the first tooth of a segment of the next gear wheel come into positive engagement with the control wheel.

2. A change speed gear according to claim 1 in which a movable switch member is provided for the displacement of the control wheel from one step to the next one and the second shaft the rotation of which displaces the control wheel is fitted with a cam disc for each gear change, each cam disc having two interruptions, one for gear change in each sense, so that said switch member is held between the nearest cam discs and the control wheel is in mesh with a gear wheel, and on being displaced in either direction the switch is engaged by the cam discs and the control wheel is positively moved into a higher or lower step.

3. A change speed gear according to claim 1, in which the spaces between all steps at the points of transition between the segment members are in alignment.

4. A change speed gear according to claim 1, in which the width of tooth of the control gear is equal to three-fifths to three-fourths of the width of the steps.

5. A change speed gear according to claim 1, in which the width of the spaces between steps is equal to one-half of the width of tooth of the control gear.

6. A change speed gear according to claim 1, in which the motion of the control gear from one step to the next corresponds to a double revolution of the stepped cone.

7. A change speed gear according to claim 1 in which a movable switch member is provided for the displacement of the control wheel from one step to the next one and the second shaft of which the rotation displaces the control wheel is fitted with a cam disc for each gear change, each cam disc having two interruptions, one for gear change in each sense, so that said switch member is held between the nearest cam discs and the control wheel is in mesh with a gear wheel, and on being displaced in either direction the switch is engaged by the cam discs and the control wheel is positively moved into a higher or lower step, said switch member being formed as a finger and pivotally mounted in a claw rigid with the control wheel.

8. A change speed gear according to claim 1 in which a movable switch member is provided for the displacement of the control wheel from one step to the next one and the second shaft the rotation of which displaces the control wheel is fitted with a cam disc for each gear change, each cam disc having two interruptions, one for gear change in each sense, so that said switch member is held between the nearest cam discs and the control wheel is in mesh with a gear wheel, and on being displaced in either direction the switch is engaged by the cam discs and the control wheel is positively moved into a higher or lower step, said switch member being formed as a finger and pivotally mounted in a claw rigid with the control wheel, said member being provided with an arm resiliently connected with means for transmitting the gear change movement.

MAX SCHÄFER.